Patented Jan. 19, 1954

2,666,756

UNITED STATES PATENT OFFICE 2,666,756

NEW CATALYTIC PROCESS FOR THE POLYMERIZATION OF ETHYLENE

Thomas Boyd, Springfield, and Robert M. Dickey, North Wilbraham, Mass., assignors to Monsanto Chemical Company, St. Louis, Mo., a corporation of Delaware No Drawing. Application March 24, 1950,
Serial No. 152,994

8 Claims. (Cl. 260—94.9)

This invention relates to a process for the polymerization of ethylene. More particularly the invention relates to a new catalyst system for the preparation of solid polymers of ethylene.

Many processes and methods have been proposed for the polymerization of ethylene to obtain polymers ranging from butylenes to materials having molecular weights in the neighborhood of 30,000. Among these proposals are systems using hydrogenation catalysts alone or in conjunction with organo metal compounds such as the alkyl lithiums. If used alone the product consists of a major proportion of butylenes and a minor proportion of higher molecular weight materials such as the hexylenes.

One object of this invention is to provide a new process for the polymerization of ethylene to obtain solid polymers thereof.

A further object is to provide a new catalyst system for the polymerization of ethylene.

Another object is to modify cobalt and nickel catalysts for the polymerization of ethylene so that solid polymers may be obtained.

These and other objects are attained by polymerizing ethylene in contact with catalytic amounts of a hydrogenating catalyst such as cobalt or nickel, a promoter, carbon monoxide and hydrogen.

The following examples are given in illustration and are not intended to limit the scope of this invention. Where parts are mentioned they are parts by weight.

Example I

A catalyst is prepared by absorbing an aqueous solution of 100 parts of cobaltous nitrate and 0.1 part of cerous nitrate on about 500 parts of purified kieselguhr. The resulting material is baked at 100°–110° C. to drive off the water and decompose the nitrates to the oxides. The oxides are then reduced to the metals by the action of a stream of hydrogen at about 300° C. The catalyst is placed in a pressure reactor which is then swept with oxygen-free nitrogen. The reactor is heated to about 300° C. and a mixture of oxygen-free ethylene, carbon monoxide and hydrogen is introduced therein under a pressure of about 500 atmospheres. The mixture contains 10 parts of hydrogen for carbon monoxide and 2.4 parts of hydrogen for every 100 parts of ethylene. The temperature is maintained at 300° C. at 500 atmospheres pressure for about 3 hours after which the pressure is released and the polymer is separated from the catalyst. The polymer obtained is colorless and has a molecular weight of about 30,000. It is exceptionally stable to heat, light and oxidation.

When Example I is repeated except that the amount of carbon monoxide is reduced to 1 part and the hydrogen to 0.08 part, the reaction conditions and time are substantially the same but the resultant polymer has a molecular weight of about 15,000.

Example II

A catalyst is prepared by absorbing a mixture of 100 parts nickel nitrate and 3 parts thorium nitrate on about 500 parts of silica gel, decomposing the nitrates to the oxides by heat and then reducing the oxides to the metals with hydrogen at about 300° C. Ethylene containing substantially no oxygen mixed with 1 part of carbon monoxide and 0.08 part of hydrogen for every 100 parts of ethylene is brought into contact with the catalyst at a pressure of about 3,000 atmospheres and a temperature of about 300° C. The polymerization reaction is stopped after about 4 hours and the pressure is released. After separation from the catalyst, a polymer is obtained having a molecular weight of about 15,000. The polymer is clear, somewhat softer than that of Example I and exceptionally stable to light, heat and oxidation.

The catalysts of this invention are cobalt and nickel in the reduced form. These metals are known as hydrogenation catalysts and various methods have been described for obtaining them in the proper form. Since they are best used when deposited on a purified diatomaceous earth, activated alumina or silica gel carrier, the preparation disclosed in the examples is convenient and economical. The process involves absorbing the nitrate of the nickel or cobalt on the carrier, decomposing the nitrate to the oxide by heat and then reducing the oxide with hydrogen at temperatures of 300° C. or above. Among the carriers which may be used are the especially purified diatomaceous earths such as kieselguhr, fuller's earth, etc. The purification of these earths is necessary to remove organic matter therefrom which might poison the catalyst. Synthetic carriers such as silica gel and activated alumina may also be used. For most efficient operation from 300 to 1,000 parts of carrier are used for each 100 parts of hydrogenation catalyst.

Associated with the cobalt and nickel catalyst, should be from 0.01 to 10 parts of a promoter per 100 parts of cobalt or nickel. These promoters are metals such as copper, silver, zinc, iron, manganese, platinum, palladium, ruthenium, magnesium, chromium, aluminum, thorium, cerium and other rare earth metals. These metals may be used in the form of their oxides or inorganic salts. However, for the best operation, these promoters should be in the form of the metal thoroughly comingled with the cobalt or nickel catalysts. It is advantageous to prepare a solution in water containing both the cobalt or nickel salt and a salt of the promoter, absorb the solution on a carrier and then reduce the salts to the metal.

The ethylene used must be substantially oxygen-free since as much as 0.06 part of oxygen per 100 parts of ethylene will interfere with the polymerization reaction. However, complete absence of oxygen is not necessary since there is some evidence that amounts of oxygen up to about 0.005 part per 100 parts of ethylene accelerates the polymerization in this catalyst system without materially affecting the polymer. Between 0.005 and 0.06 part of oxygen there is a gradual increase in interference with the polymerization reaction and above 0.06 part the polymers obtained are quite low in molecular weight and unstable.

The temperature and pressure conditions for the system are broadly from 100°–400° C. and 50–6,000 atmospheres pressure. A combination of low temperature and low pressure will direct the reaction towards higher molecular weight polymers while a combination of high temperature and high pressure promotes the preparation of low molecular weight materials. For obtaining an easily moldable resin, it is preferred to have a polymer of a molecular weight of 15,000 to 40,000. To obtain polymers within this range, temperatures of between 200° and 300° C. should be used in conjunction with pressures of from 500 to 3,000 atmospheres.

The molecular weight and stability of the polymers produced by the process of this invention is not only dependent on the temperature and pressure of the reaction but also on the amount of carbon monoxide and hydrogen used. Broadly these regulators may be used in amounts ranging from 0.001 to 0.2 mol of carbon monoxide and from 0.001 to 0.6 mol of hydrogen per mol of ethylene. However, these ranges may be broken down into three separate classes. If the amount of carbon monoxide is restricted to from 0.001 to 0.01, with a corresponding restriction of the hydrogen, the molecular weight of the polymers obtained will vary from 100 to 15,000 depending partially on the amount of regulator and partially on the temperature and pressure conditions. These polymers are increasingly stable to heat, light and oxidation as the amount of carbon monoxide-hydrogen regulator is increased. In the range of from 0.01 to 0.1 mol of carbon monoxide and 0.01 to 0.3 mol of hydrogen, the molecular weight will vary between 15,000 and about 30,000. The polymers produced under these conditions are remarkably clear and stable to heat, light and oxidation. They show much less crystallinity than polymers prepared by other methods for polymerizing ethylene. When the amount of carbon monoxide is raised to between 0.1 and 0.2 mol with corresponding increases in the amount of hydrogen, the molecular weight of the resulting polymer tends to decrease from 30,000 down to about 4,000 and the polymers are decreasingly stable. However, they do exhibit increased clarity and are more amorphous in character than polymers produced in the preferred range.

The process of this invention is particularly advantageous in that it provides a method for producing clear ethylene polymers which are more stable to heat, light and oxidation than polymers made by the conventional methods. It is also beneficial in that the course of the reaction may be accurately controlled by controlling the amounts of carbon monoxide and hydrogen.

It is obvious that many variations may be made in the products and processes of this invention without departing from the spirit and scope thereof as defined in the appended claims.

What is claimed is:

1. A process which comprises polymerizing ethylene in the substantial absence of oxygen in the presence of a hydrogenation catalyst, a promoter, carbon monoxide and hydrogen at temperatures of from 100°–400° C. and pressures of from 50–6,000 atmospheres, the hydrogenation catalyst being taken from the group consisting of metallic nickel and cobalt, the promoter being taken from the group consisting of copper, silver, zinc, iron, manganese, platinum, palladium, ruthenium, magnesium, chromium, aluminum, thorium, cerium and the oxides and inorganic salts thereof, the ratio of promoter to catalyst being from 0.01 to 10 parts of promoter per 100 parts of catalyst, the carbon monoxide being present in amounts ranging from 0.001 to 0.2 mol per mol of ethylene and the hydrogen being present in the ratio of from 1 to 3 mols per mol of carbon monoxide.

2. A process as in claim 1 wherein the temperature is from 200°–300° C., the pressure is from 500 to 3,000 atmospheres and the carbon monoxide is present in amounts ranging from 0.01 to 0.1 mol per mol of ethylene.

3. A process as in claim 1 wherein the catalyst is cobalt.

4. A process as in claim 1 wherein the catalyst is nickel.

5. A process as in claim 1 wherein the promoter is cerium.

6. A process as in claim 1 wherein the promoter is thorium.

7. A process as in claim 1 wherein oxygen is present in amounts up to 0.005 part per 100 parts of ethylene.

8. A process as in claim 1 wherein the catalyst is prepared in situ immediately prior to the reaction on a carrier taken from the group consisting of diatomaceous earth free from organic matter, silica gel and activated alumina.

THOMAS BOYD.
ROBERT M. DICKEY.

References Cited in the file of this patent

UNITED STATES PATENTS

| Number | Name | Date |
|---|---|---|
| 2,495,292 | Scott | Jan. 24, 1950 |
| 2,595,096 | Parker | Apr. 29, 1952 |

OTHER REFERENCES

U. S. Bureau of Mines "R. I. 4270," June 1948, pages 4, 5, 6, 8, 9 and 19.